H. H. Craigie,
Water-Closet Valve.
N° 84,262. Patented Nov. 24, 1868.

Witnesses
Geo. A. Walker
Chas H Smith

Inventor,
H H Craigie

HUGH H. CRAIGIE, OF NEW YORK, N. Y.

*Letters Patent No. 84,262, dated November 24, 1868.*

IMPROVEMENT IN WATER-CLOSETS.

The Schedule referred to in these Letters Patent and making part of the same.

*To all whom it may concern:*

Be it known that I, HUGH H. CRAIGIE, of the city and State of New York, have invented, made, and applied to use, a certain new and useful Improvement in Cocks for Water-Closets; and I do hereby declare the following to be a full, clear, and exact description of the said invention, reference being had to the annexed drawing, making part of this specification, wherein—

Similar marks of reference denote the same parts.

Figure 3:
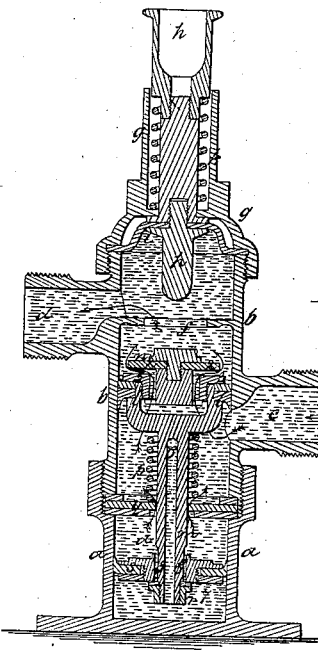
Figure 3 is a section of the cocks, with the parts in the position they assume as the water commences to run.

The object of this invention is to provide a valve or cock for water-closets that is acted upon by a connection to the seat, and moved when the person sits down, but the water does not commence to flow until the weight is taken off the seat, and the valve closes gradually, allowing the water to run the desired length of time. This cock, however, may be moved by a connection to the pull or lever of the closet.

In Letters Patent granted to me December 31, 1867, a cock is shown, in which the chamber that contains water, to regulate the gradual closing of the valve, is on the same side of the valve as the inlet of the water, and hence is always filled. The same character of chamber is employed in the present valve, but the arrangement and construction of the parts are different.

My present invention relates to a valve, applied to a piston, and rod to admit the water into the chamber that controls the valve, and said valve closes as the chamber comes into operation. Also, to a sliding piston and valve, combined with a stationary seat, and arranged in such a manner that said valve has a seat on both sides of it, and when closed upon the seat of the piston, keeps that tight, and when closing upon the stationary seat, prevents the water passing to the closet, but while in an intermediate position, the water runs through the piston and stationary seat to the water-closet.

In the drawing—

*a* is the cylinder, forming the valve-controlling chamber. This is supported by a flange or other convenient means of attachment to the platform or closet.

*b* is the cylinder, forming the passage-way between the inlet-pipe *c* and outlet-pipe *d*, and in which is the stationary valve-seat *f*.

*g* is a screw-cap, with the valve-opener *a*, actuated from the water-closet seat, or from the pull or lever, in any convenient manner. This is shown as formed with a diaphragm, *i*, and lifting-spring *k*, but the valve-opener may pass through a stuffing-box or other packing.

The piston *l* is on a rod, *m*, and said piston is formed as a ring, receiving the valve *n*, the body of which valve sets within said ring, and has lips 1 1 to limit the motion and prevent the valve getting out of place, but grooves or channels in said body allow the water to pass freely through the ring-piston.

Figure 1:
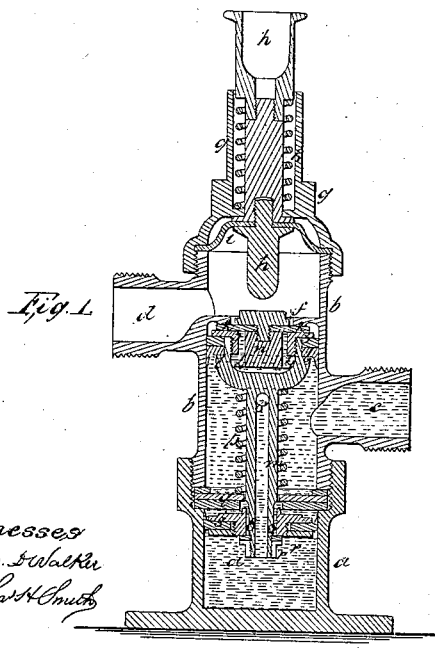
Figure 1 is a vertical section of the said cock as closed.

The leather or elastic face, 2, of the valve *n*, makes said valve tight, when in contact with the seat 3, of the piston *n*, or when in contact with the seat *f*, and when both are in contact with said leather 2, as in fig. 1, leakage through the cock becomes impossible.

The spring *p* acts to lift the piston *l*. The flow of water also acts in the same direction.

It will now be understood that the closing-movement of the valve and piston being rendered gradual by a controlling water-chamber or other device, (such devices are known; one special construction is hereafter described,) the operation will be as follows:

The valve-opener *h* being moved, acts against the valve *n*, moving that away from the seat *f*, and also moving the piston *l*, (see fig. 2,) but water cannot pass said piston, because the valve *n* keeps its opening closed, but the moment the opener *h* is relieved, the pressure of water lifts the valve *n*, allowing the water to run through the piston *l*, as indicated in fig. 3, until, by the gradual movement of the piston *l*, the valve *n* reaches the seat *f*, shutting off the further flow of water to the closet.

The piston *l* is packed with leather washers, or other suitable material.

The piston-rod *m* is made hollow, with an opening at 6, so that water can freely pass into the chamber *a*, below the piston *s*.

The diaphragm or cylinder-head *q* is introduced between the cylinder *b* and the cylinder *a*, and is rendered tight by washers.

At the end of the rod *m* is a nut, *r*, and leather, 7, and *s* is a piston around the rod *m*, fitting tightly the controlling-chamber, formed by the cylinder *a*.

A slight play is allowed of the rod, endwise, through the piston *s*, and grooves are formed at this point, as at 8.

Figure 2:
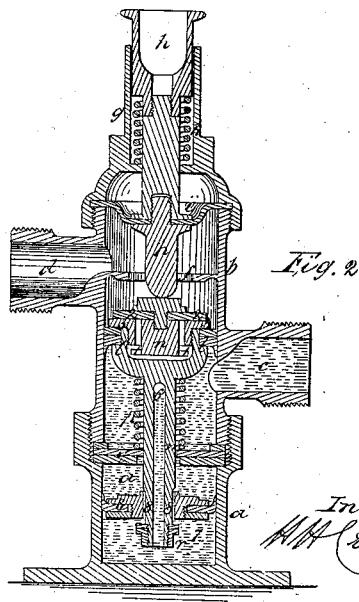
Figure 2 is a similar view of the said cock in the position the parts assume while the piston is being pressed down.

It will now be understood that the piston-rod *m*, when depressed, moves the nut *r* and washer 7 from contact with the piston *s*, allowing the water to pass from one side of the piston *s* to the other, through the slots 8, as the piston is moved along with the rod *m*, as indicated in fig. 2, but as soon as the pressure of *h* is removed, the piston-rod moving endwise, closes the openings 8, by the washer 7, (see fig. 3,) and the water confined in the chamber, between the piston *s* and diaphragm *q*, controls the movement of the water-closet valve in closing, as the water is forced out of the chamber.

The leakage upward, around the piston-rod *m*, allows the valve to close gradually in the desired length of time, and the proper amount of water to run into the closet.

The extent of motion given to the valve will determine the length of time that the water is allowed to run to the closet.

It will be evident that instead of the water passing through the hollow piston-rod $m$, a connection might be made from the pipe $c$ to the lower end of the cylinder $a$, or a separate cylinder, with a head taking the place of the diaphragm $q$, might be introduced within the cylindrical part of the cock.

If the piston $s$ were attached firmly to the end of the rod $m$, the nut $r$ and leather 7 might be applied around the piston-rod $m$, at the diaphragm $q$, in the form of a ring-valve, that would slide, to allow the inlet of water to the chamber, or close to confine said water, and control the closing of the closet by the gradual leakage.

What I claim, and desire to secure by Letters Patent, is—

1. The piston $l$, moving in the cylinder $b$, between the inlet and outlet-pipes, in combination with the valve $n$ and seat $f$, the parts being arranged and operating substantially as and for the purposes set forth.

2. The rod $m$, piston $s$, and valve-controlling chamber $a$, in combination, with the water-way 8, and valve $n$, to the water-closet, substantially as specified, so that the end-movement given to the piston-rod shall open or close the water-way 8, for the purposes specified.

3. The valve $r$, applied at the piston-rod $m$, in combination, with the valve-controlling chamber $a$, and a piston, moving in said chamber, to regulate the closing of a water-closet valve, substantially as set forth.

In witness whereof, I have hereunto set my signature, this 30th day of January, A. D. 1868.

H. H. CRAIGIE.

Witnesses:
 CHAS. H. SMITH,
 GEO. D. WALKER.